Figure 1:
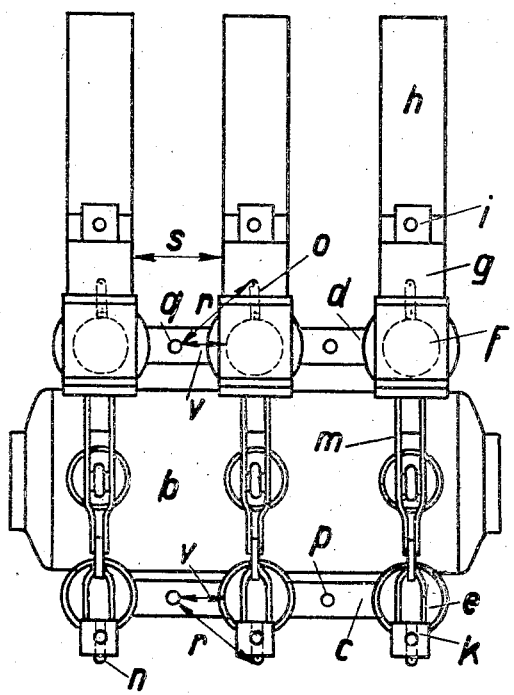

Patented Apr. 9, 1946

2,397,912

UNITED STATES PATENT OFFICE 2,397,912

PROTECTIVE SWITCH GEAR

Fritz Beldi, Baden, Switzerland, assignor to Aktiengesellschaft Brown, Boveri & Cie., Baden, Switzerland Application September 16, 1942, Serial No. 458,540
In Switzerland August 11, 1941

4 Claims. (Cl. 200—48)

Electrical power plants are nowadays adequately protected against the disturbing effect of power line overvoltages when the various components of the plant are arranged and dimensioned, in accordance with standard specifications for high-voltage apparatus, to space the conductive elements apart by air gaps of sufficient length to prevent flash-over from any abnormally high power line voltage. On the other hand atmospheric disturbances, particularly flash-overs caused by lightning, cannot be avoided but can be conducted to points in the plant where they disturb the service as little as possible.

Various arrangements of protective arc gaps or lightning arresters are employed on the distribution network to "bleed off" overvoltages of atmospheric origin. If, however, dangerous overvoltages should nevertheless reach the power stations beyond this protective stage, the valuable parts of the plant, particularly machines and transformers must be protected against insulation breakdown by external protective devices.

The method of protecting the high-voltage apparatus, which above all consists in allowing flash-overs to occur only to earth and not between phases or over the air gap of an open disconnecting switch, serves on the one hand to protect the more valuable components of the plant and on the other hand to maintain the plant in operation. In order to achieve this purpose with switch apparatus, the flash-over voltages between the switch phases and across the air gaps of open disconnecting switches must be greater than those between conductive parts and earth. Experiments have, however, shown that, especially with the indoor type of apparatus, the lengths of the air gaps between phases and at the disconnecting switches become too large when the aforementioned condition is adhered to.

The object of the present invention is to provide indoor switch apparatus having protective spark gaps that insure the discharge to earth of overvoltages of atmospheric origin and that do not necessitate any increase in the air insulation distances that afford protection against a power line flash-over between conductors of different phase or voltage. The apparatus for directing atmospheric flash-overs along preselected paths is based upon the known fact that the flash-over voltage for a spark gap with point and plate electrodes has a lower value when the potential of the point is positive than when it is negative.

According to the invention therefore the protective spark gaps are formed between the metal fittings at the opposite ends of the insulators and point electrodes at both the network and the earth side of the respective insulators, the point electrodes being so located, with respect to each other and to their cooperating insulator fittings, that overvoltages of atmospheric origin will jump to earth from a point electrode to its cooperating fitting and not from one point electrode to another. In other words, the addition of the point electrodes to facilitate the discharge of lightning voltage surges to earth does not decrease the effective air gaps originally provided for voltage insulation between phases and across open disconnecting switches.

Figure 2:
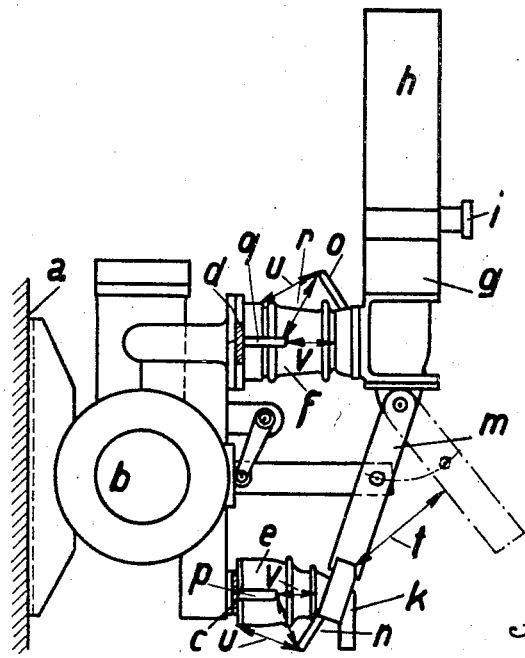

A constructional example of the invention is illustrated diagrammatically in the drawing, a three-phase air blast circuit breaker for indoor installation being shown in front elevation in Fig. 1 and an end view of same in Fig. 2, the front switch phase being omitted from the latter figure.

The circuit breaker is mounted on its compressed air container $b$ which is fixed to the wall $a$. The cross-arms $c$ and $d$ for the six insulators $e$ and $f$ are located on the air container $b$. Each of the three upper insulators $f$ supports an air blast switch chamber $g$ with a silencer $h$, connecting terminal $i$ and a knife switch $m$ pivoted to the underside of the switch chamber. The stationary contact for the knife switch together with the second terminal $k$ is arranged on the head of the lower insulator $e$. On the heads of the three lower insulators $e$ outwardly directed point electrodes $n$ are located, while on the head of the upper insulators $f$ point electrodes $o$ are arranged, these forming a protective gap between the insulator head and the insulator base. Additional point electrodes $p$ are arranged in the middle between the switch phases on the earthed cross-arms $c$ and $d$ which are conductively connected with the insulator bases, the electrodes $p$ being located on the cross-arm $c$ and the electrodes $q$ on the cross-arm $d$. The metal fittings that cooperate with the point electrodes $n$, $o$ and $p$ function as the "plate" electrodes of spark gaps since the surfaces of the fittings are not sharply curved or pointed. The flash-over paths $u$, $v$ are somewhat shorter than the sparking lengths of the insulators, the paths $u$ being from the "live" point electrodes $n$, $o$ to ground and the paths $v$ being from the grounded point electrodes $p$, $q$ to the "live" metal fittings at the heads of the insulators. The particular flash-over path that becomes operative to bypass a voltage surge to ground depends upon the polarity of voltage surge, the flash-over paths $u$ having a minimum resistance to break-down when the high tension line is brought to a positive potential by the surge and the flash-over paths $v$ having a minimum resistance when the line potential is negative. The paths $u, v$ are of course shorter than the voltage isolation gap $t$ of the disconnect switch $m$.

It is essential, for adequate protection of the station equipment, that voltage surges be discharged to ground and not from one conductor or phase to another. The air distances $s$ between different phases can be made relatively short, and without danger of phase-to-phase faults, by making the voltage flash-over paths $u, v$ somewhat shorter than the phase separation $s$. The point electrodes $n, o$ on the insulator heads are spaced from the grounded point electrodes $p, q$ by gaps $r$ of greater length than the flash-over paths $u, v$, thereby eliminating any possibility of a phase-to-phase disturbance in the event that voltage surges on adjacent phases are simultaneously discharged to ground.

In the illustrated embodiment of the invention, the point electrodes $n, o$ are located in vertical planes through the axes of the several circuit breakers $h$ and associated disconnect switches $m$ and are spaced from the respective earthed or grounded point electrodes $p$ and $q$ by 90°. However, the invention is not limited to this arrangement as the only essential requirement is that the two point electrodes $n, p$ or $o, q$ associated with an insulator be so located as to preclude a point-to-point flash-over. This condition is essential since, as indicated above, a simultaneous voltage discharge from "live" point electrodes of two phases to a single grounded point electrode might result in a phase-to-phase fault.

In order to obtain certain protection the flash-over path between the electrode and the fitting need only be slightly smaller than the sparking length of the insulator. By means of the arrangement according to the invention it is also possible to reduce the distances between the phases of the circuit breaker, thus saving material and space and at the same time affording protection against damage from overvoltages of atmospheric origin as well as damage from voltages and overvoltages arising within the power distribution system.

I claim:

1. In a multiphase indoor switch system, the combination with a circuit breaker and a disconnecting switch for each phase, a set of insulators secured to an earthed framework and supporting the respective circuit breakers, and a second set of insulators vertically alined with those of the first set and each supporting a contact of a disconnecting switch, the live conducting parts of adjacent phases having a minimum spacing $s$, each insulator having a platelike metallic member at each end thereof, of means for reducing the likelihood of interphase flashover due to voltage surges of either positive or negative polarity on the respective phases; said means comprising a point electrode on each of the live metallic members of each insulator spaced from the grounded platelike member at the opposite end of the insulator individual thereto a distance $u$, and an earthed point electrode between adjacent pairs of insulators and spaced from the live platelike members thereof a distance $v$ and from the nearest live point electrode a distance $r$, the distances $u$ and $v$ each being substantially less than the distances $s$ or $r$, whereby either a positive or a negative voltage surge on any of the phases is discharged to ground by the associated live point electrode or by the associated grounded point electrode respectively.

2. In a multiphase indoor switch system, the invention as recited in claim 1 wherein the two point electrodes associated with an insulator are spaced apart by at least 90°.

3. In a multiphase indoor switch system, the invention as recited in claim 1, wherein said earthed framework includes a pair of cross-arms upon which the respective sets of insulators are mounted, and the earthed point electrodes are secured to said cross-arms.

4. In a multiphase indoor switch system, the invention as recited in claim 1, wherein said earthed framework includes a pair of cross-arms upon which the respective sets of insulators are mounted, there being three insulators in each set, the earthed point electrodes comprise two electrodes mounted on each cross-arm, the point electrodes being located between adjacent insulators, and the point electrodes at the network side of the insulators are supported on the insulator fittings at the energized ends of the insulators, said last point electrodes being spaced 90° from the earthed point electrodes.

FRITZ BELDI.